United States Patent
LaMarca, Sr.

(10) Patent No.: US 9,486,862 B1
(45) Date of Patent: Nov. 8, 2016

(54) FLY CUTTER CUTTING TOOL

(71) Applicant: Anthony P. LaMarca, Sr., Machesney Park, IL (US)

(72) Inventor: Anthony P. LaMarca, Sr., Machesney Park, IL (US)

(*) Notice: Subject to any disclaimer, the term of this patent is extended or adjusted under 35 U.S.C. 154(b) by 0 days.

(21) Appl. No.: 14/714,269

(22) Filed: May 16, 2015

Related U.S. Application Data (60) Provisional application No. 62/029,091, filed on Jul. 25, 2014.

(51) Int. Cl.
*B23C 5/02* (2006.01)
*B23C 5/00* (2006.01)
*B23F 19/10* (2006.01)

(52) U.S. Cl.
CPC .............. *B23C 5/006* (2013.01); *B23C 5/003* (2013.01); *B23C 5/02* (2013.01); *B23C 2210/241* (2013.01); *B23C 2220/44* (2013.01); *B23C 2220/60* (2013.01); *B23C 2250/04* (2013.01); *B23F 19/107* (2013.01)

(58) Field of Classification Search
CPC ......... B23C 5/006; B23C 5/003; B23C 5/02; B23C 2210/54; B23C 2240/16; B23B 29/12; B23F 19/107; B23F 21/20; B23F 21/203; B23F 21/206; Y10T 82/16131
See application file for complete search history.

(56) References Cited

U.S. PATENT DOCUMENTS

| | | | |
|---|---|---|---|
| 2,375,926 A | | 5/1945 | Julian |
| 2,618,992 A | * | 11/1952 | Charles ................... B23B 51/05 125/20 |
| 2,906,145 A | * | 9/1959 | Morse ...................... B23B 51/05 408/181 |
| 3,019,676 A | | 2/1962 | Bogdan |
| 3,130,610 A | | 4/1964 | Bogdan |
| 3,332,130 A | * | 7/1967 | Armstrong ............ B23C 5/2427 407/44 |
| 3,343,431 A | * | 9/1967 | Boyer ................. B23B 27/1662 407/101 |
| 3,686,728 A | | 8/1972 | Fried |
| 3,733,665 A | | 5/1973 | Spriggs |
| 3,785,746 A | * | 1/1974 | Wolf ..................... B23B 29/025 408/182 |
| 3,922,766 A | | 12/1975 | Malinchak |
| 4,040,156 A | | 8/1977 | Tack |
| 4,054,977 A | * | 10/1977 | Plummer ............ B23B 27/1644 407/108 |
| 4,231,691 A | * | 11/1980 | Pape ................. B23B 29/03407 407/39 |
| 4,541,757 A | * | 9/1985 | Reynolds .................. B23C 5/02 144/219 |
| 4,564,321 A | | 1/1986 | Kondo et al. |
| 4,955,767 A | * | 9/1990 | Kaiser ............... B23B 29/03414 408/146 |

(Continued)

FOREIGN PATENT DOCUMENTS

| | | | | |
|---|---|---|---|---|
| EP | 564425 A1 | * | 10/1993 | ........... B23B 29/034 |
| JP | 10-291103 A | * | 11/1998 | ........... B23B 29/034 |

OTHER PUBLICATIONS www.practicalmachinist.com/vb/bridgeport-hardinge-mills-lathes/diy-flycutter-213868.

(Continued)

*Primary Examiner* — Sunil K Singh
*Assistant Examiner* — Ryan Rufo
(74) *Attorney, Agent, or Firm* — Brie A. Crawford (57) ABSTRACT

A fly cutter cutting tool is disclosed by this invention. The fly cutter cutting tool has a mounting shaft and a cutting base in a T-arrangement to provide a counter-balance. The carbide insert is attached to the working end. The working end has a rake angle to aid in clearing chips from beneath the tool holder and aid in the cutting process. The working end also has a hood to create a downward angle to deflect machined chips to prevent fouling of the work piece during cutting. The mounting shaft is attached to the cutting base at a perpendicular or a substantially perpendicular angle.

10 Claims, 14 Drawing Sheets

(56) References Cited

U.S. PATENT DOCUMENTS

| | | | |
|---|---|---|---|
| 5,033,923 A | 7/1991 | Osawa | |
| 5,052,153 A * | 10/1991 | Wiand | B24B 13/01 407/119 |
| 5,102,268 A * | 4/1992 | Mitchell | B23C 5/241 407/36 |
| 5,148,845 A * | 9/1992 | Keup | B23B 51/05 144/218 |
| 5,154,554 A | 10/1992 | Ariyoshi | |
| 5,236,290 A * | 8/1993 | Mittleman | B23B 51/05 408/183 |
| 5,263,995 A | 11/1993 | Mogilnicki et al. | |
| 5,382,122 A | 1/1995 | Mihic | |
| 5,516,242 A * | 5/1996 | Andronica | B23B 51/00 407/11 |
| 5,735,649 A * | 4/1998 | Boscarino | B23B 29/03428 407/39 |
| 5,909,986 A | 6/1999 | Kaiser et al. | |
| 6,000,449 A | 12/1999 | De Marco | |
| 6,053,678 A | 4/2000 | D'Andrea | |
| 6,056,484 A | 5/2000 | Mitchell et al. | |
| 6,419,427 B1 | 7/2002 | Galamba et al. | |
| 7,080,963 B2 | 7/2006 | Schaupp et al. | |
| 8,684,638 B2 * | 4/2014 | Buck | B23B 29/03407 408/16 |
| 2013/0064616 A1 * | 3/2013 | Nakamura | B23B 29/03421 408/1 R |
| 2013/0294855 A1 * | 11/2013 | Freyermuth | B23B 29/0341 408/18 |

OTHER PUBLICATIONS http://speedtalk.com/forum/viewtopic.php?f=1&t=21387.
http://smg.photobucket.com/user/pistonskirt/media/Flycutter/Flycutter002.jpg.html.

* cited by examiner

FLY CUTTER CUTTING TOOL

CROSS REFERENCE TO RELATED APPLICATION AND INCORPORATION BY REFERENCE

This application claims priority to the previously filed United States of America Provisional Patent Application titled FLY CUTTER CUTTING TOOL, with an application filing date of Jul. 25, 2014, in the United States Patent and Trademark Office, Application No. 62/029,091, said application by the same inventive entity, with the entirety of said application being incorporated herein by reference to provide continuity of disclosure.

BACKGROUND OF THE INVENTION

A fly cutter cutting tool is useful when used in conjunction with a milling or Computer Numerical Control (hereinafter "CNC") machine. A fly cutter cutting tool is used to rough cut stock blank metal prior to further finish cuts. Also, a fly cutter cutting tool may be used to semi-rough cut or finish metal. The blank stock metal must be rough cut and it is beneficial to expedite this process to save time and money. Once the rough cut is completed, the finer machine cutting steps may begin. A fly cutter cutting tool is useful for the removal of bulk material from working stock blank metal due to the broad area machined in a series of single passes. Further, the fly cutter cutting tool may be used to complete finishing or intermediate step cuts. There are other cutting tools on the market. These tools are capable of performing the rough cutting, semi-rough cutting or finishing. However, the tools of the prior art have limitations.

Current tools are designed so they do not have a counter-balance. These tools are limited in their cutting speeds because of this lack of counter-balance. The counter-balance is necessary to enable turning the fly cutter cutting tool at higher revolutions and cutting speeds. Any imbalance creates stress on the milling machine and work piece because any centrifugal or centripetal imbalance creates inaccuracy in cutting as well as high amounts of vibratory stress on the precision tool mount of the milling machine. These stresses and imbalances are accentuated especially at higher cutting speeds. A fly cutter cutting tool with a counter-balance will be a useful invention.

A fly cutter cutting tool may accumulate machined chips underneath the tool in the vicinity of the carbide insert. It becomes further useful to provide a tool with a downward rake angle near the carbide insert for the shunting of waste material away from the tool. This feature prevents the accumulation of chips and waste material and helps prevent fouling between the cutting tool and the work piece.

There are fly cutter cutting tools on the market adapted for use with three-sided carbide inserts. The three-sided carbide inserts have fewer cutting surfaces than four-sided carbide inserts. The three-sided carbide inserts have fewer cutting sides and thus, have a shorter lifespan and need to be replaced more frequently. The replacement of a carbide inserts means additional time and money spent on the insert itself in addition to the time and money spent on the downtime of the machine while replacing the insert. A fly cutter cutting tool that is designed to accommodate a four-sided carbide insert will be a useful invention.

SUMMARY OF THE INVENTION

An objective of the present invention is the provision of a fly cutter cutting tool that provides for a counter-balance in forces to optimize high cutting speed passes on the work piece.

Also, an objective of the present invention is the provision of a fly cutter cutting tool that has a mounting shaft which is perpendicular or substantially perpendicular to the cutting base.

A further objective of the present invention is the provision of a fly cutter cutting tool that is precise in making these high cutting speed passes on the work piece.

A still further objective of the present invention is the provision of a fly cutter cutting tool that has a downward rake angle to allow for the shunting of machined chips and waste material away from the tool and helps to prevent fouling between the cutting tool and the work piece.

Moreover, an objective of the present invention is the provision of a fly cutter cutting tool which is adapted to receive a four-sided carbide insert.

A still further objective of the present invention is the provision of a fly cutter cutting tool which has a relief angle bevel on the counter-balance so that the fly cutter cutting tool can rotate freely without striking a shoulder of the work piece.

Also, an objective of the present invention is the provision of a fly cutter cutting tool which has a rake angle to facilitate a cut that decreases the force necessary to complete the cut as well as reduction in harmonic chattering, or skip cutting, between the carbide insert and the work piece.

Another objective of the present invention is the provision of a fly cutter cutting tool which has at least two shaft locking surfaces on the mounting shaft to facilitate a secure attachment to the power head of the milling machine.

These and other objectives of the invention (which other objectives become clear by consideration of the specification, claims and drawings as a whole) are met by providing a fly cutter cutting tool with a mounting shaft and cutting base which are counter-balanced.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Reference will now be made in detail to several embodiments of the invention that are illustrated in the accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear and front, may be used with respect to the drawings. These and similar to directional terms are not to be construed to limit the scope of the invention in any manner. The words attach, connect, couple and similar terms with their inflectional morphemes do not necessarily denote direct or intermediate connections, but may also include connections through mediate elements or devices.

A fly cutter cutting tool is disclosed in this invention. The fly cutter cutting tool is designed to be used with any commercial milling machines including but not limited to horizontal and vertical milling machines and CNC machines.

The fly cutter cutting tool has a cutting base and a mounting shaft. The cutting base and the mounting shaft may be a unitary piece (see FIGS. 13 through 20). Or, the cutting base and the mounting shaft can be two separate pieces secured together through any suitable attachment methods including but not limited to welding (see FIGS. 4 through 12).

Figure 1:
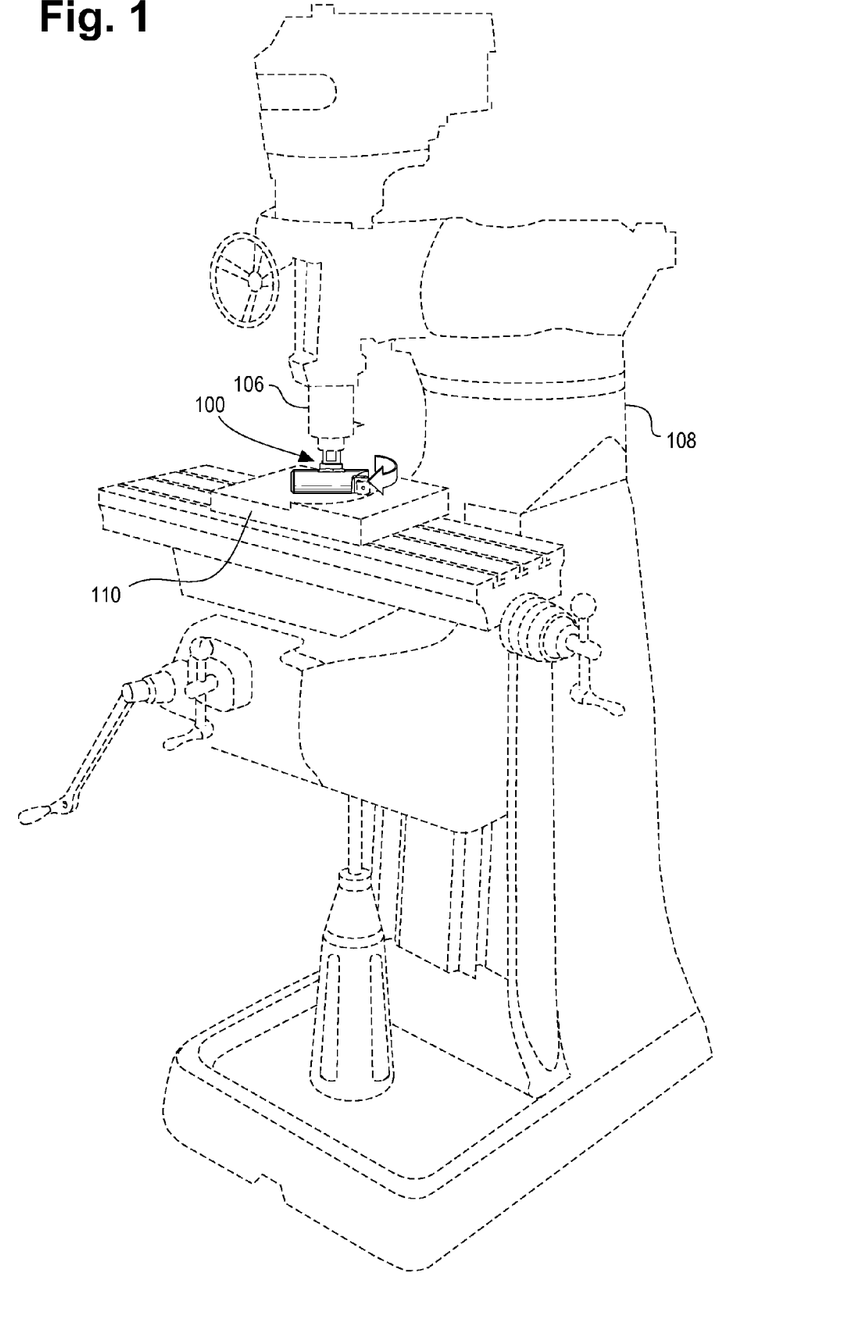
FIG. 1 depicts a top perspective view of fly cutter cutting tool 100 functionally attached to horizontal milling machine 108 with work piece 110 and further depicting horizontal milling machine 108, work piece 110 and the carbide insert in phantom.
Figure 2:
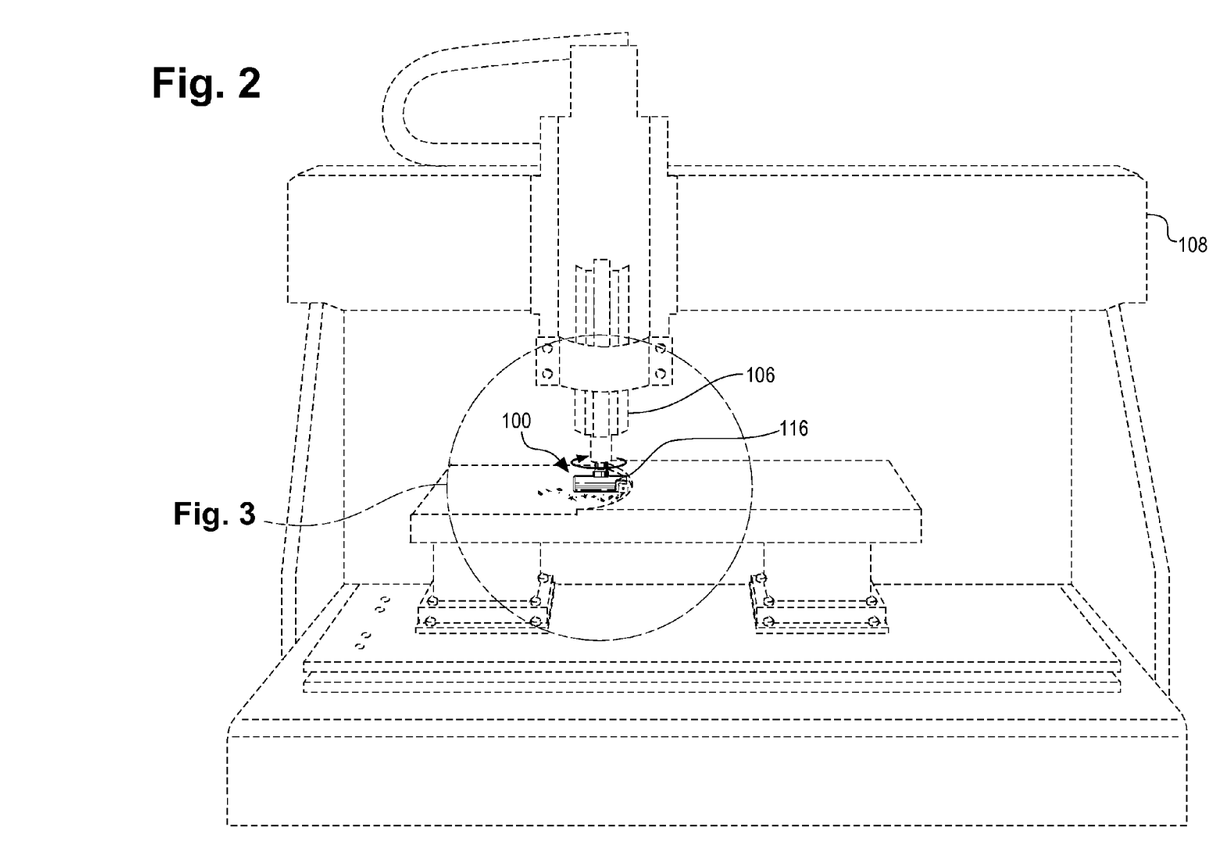
FIG. 2 depicts a top perspective view of a second use of fly cutter cutting tool 100 functionally attached to horizontal milling machine 108 of a different design with work piece 110 and further depicting horizontal milling machine 108, work piece 110 and the carbide insert in phantom.
Figure 3:
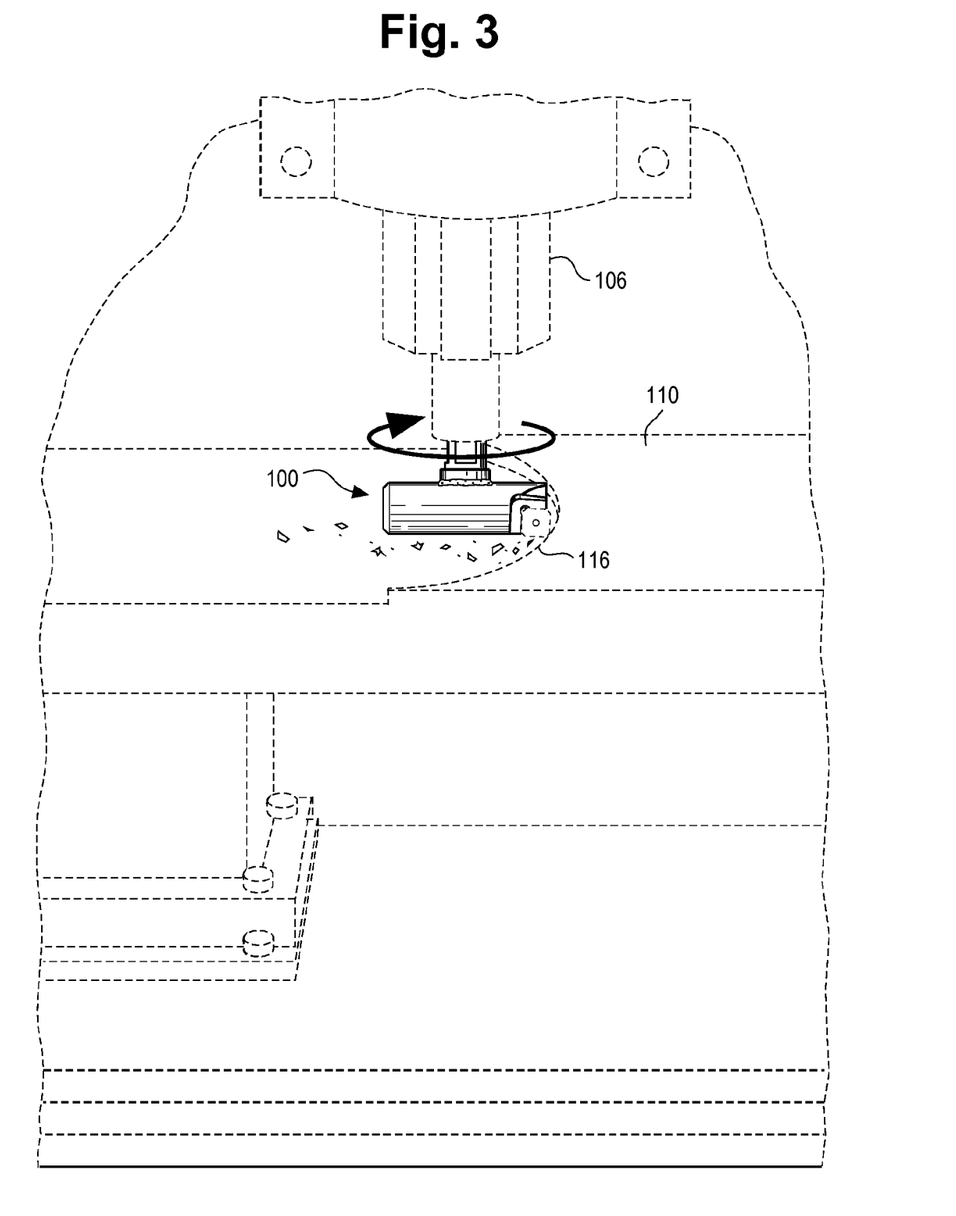
FIG. 3 depicts a top perspective detailed view, as referenced in FIG. 2, of fly cutter cutting tool 100 functionally attached to horizontal milling machine 108 with work piece 110 and further depicting horizontal milling machine 108, work piece 110 and the carbide insert in phantom.
Figure 4:
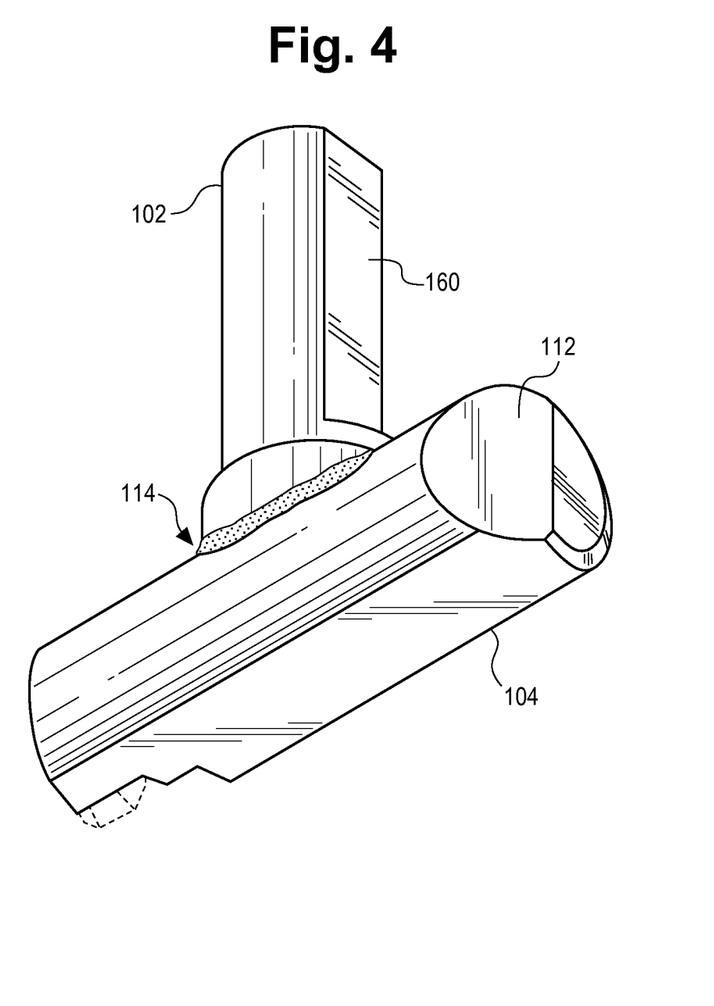
FIG. 4 depicts a rear perspective view of fly cutter cutting tool 100 with the carbide insert depicted in phantom.
Figure 5:
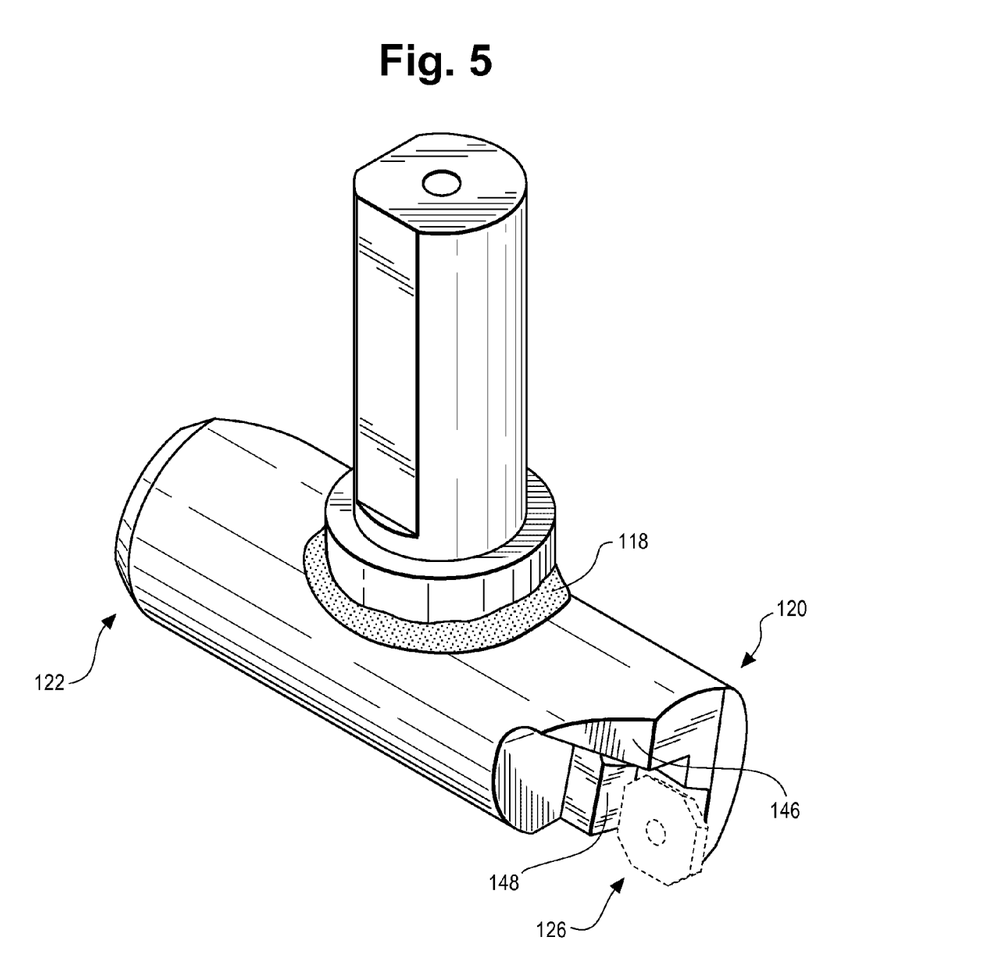
FIG. 5 depicts a front perspective view of fly cutter cutting tool 100 with the carbide insert depicted in phantom.
Figure 6:
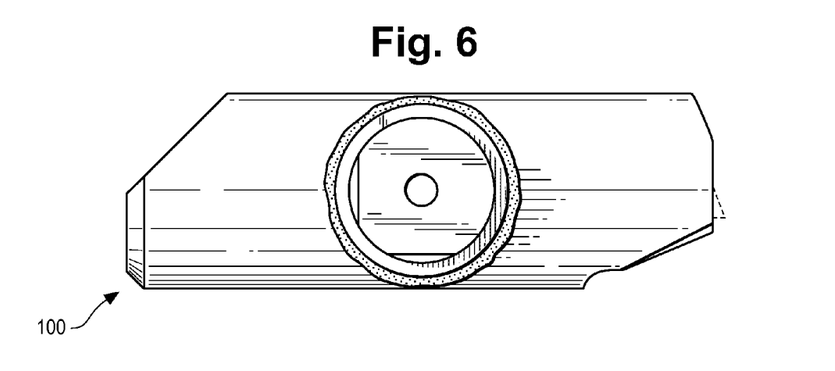
FIG. 6 depicts a top plan view of fly cutter cutting tool 100 with the carbide insert depicted in phantom.
Figure 7:
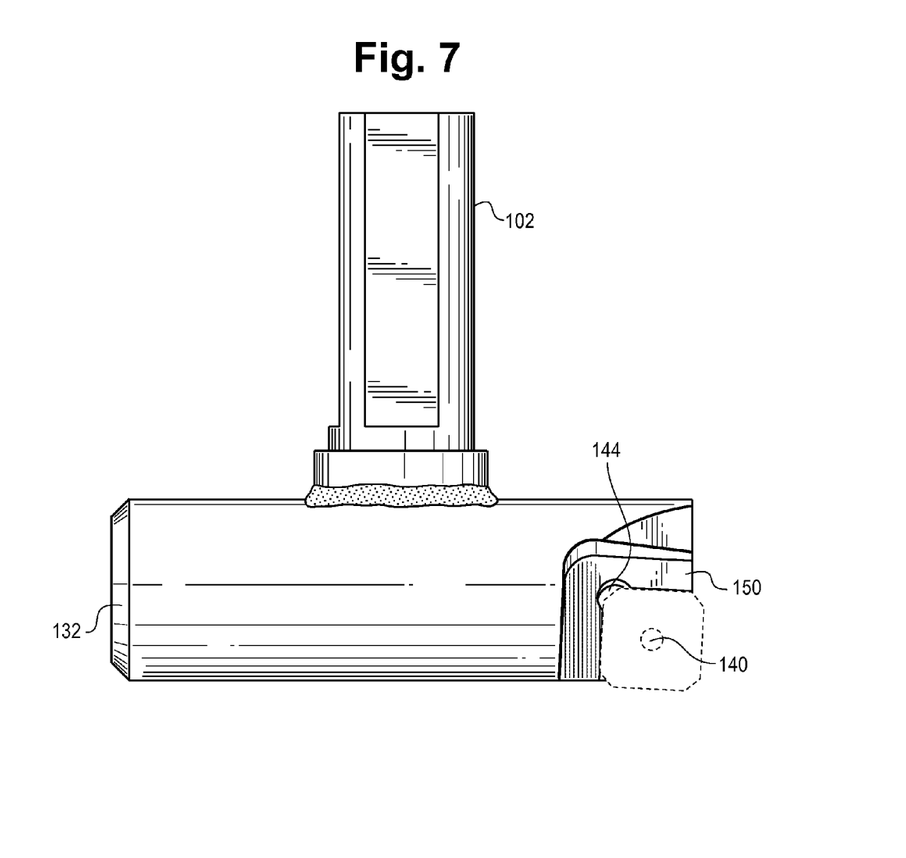
FIG. 7 depicts a front plan view of fly cutter cutting tool 100 with the carbide insert depicted in phantom.
Figure 8:
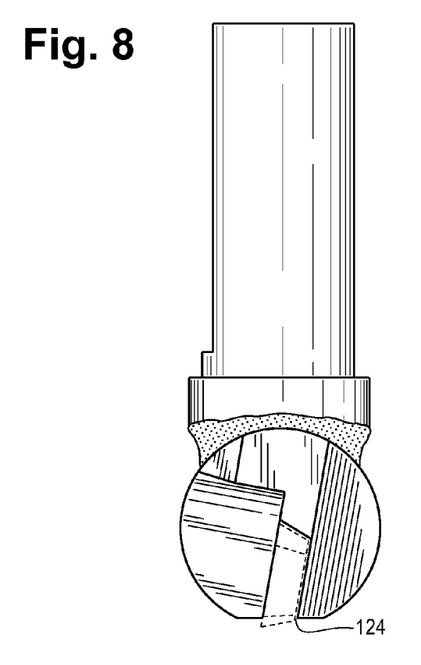
FIG. 8 depicts a right plan view of fly cutter cutting tool 100 with the carbide insert depicted in phantom.
Figure 9:
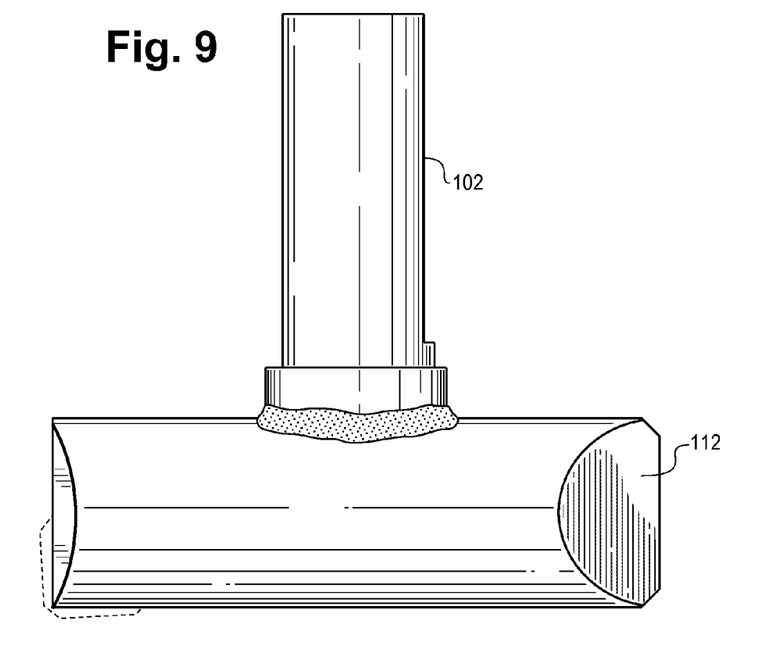
FIG. 9 depicts a rear plan view of fly cutter cutting tool 100 with the carbide insert depicted in phantom.
Figure 10:
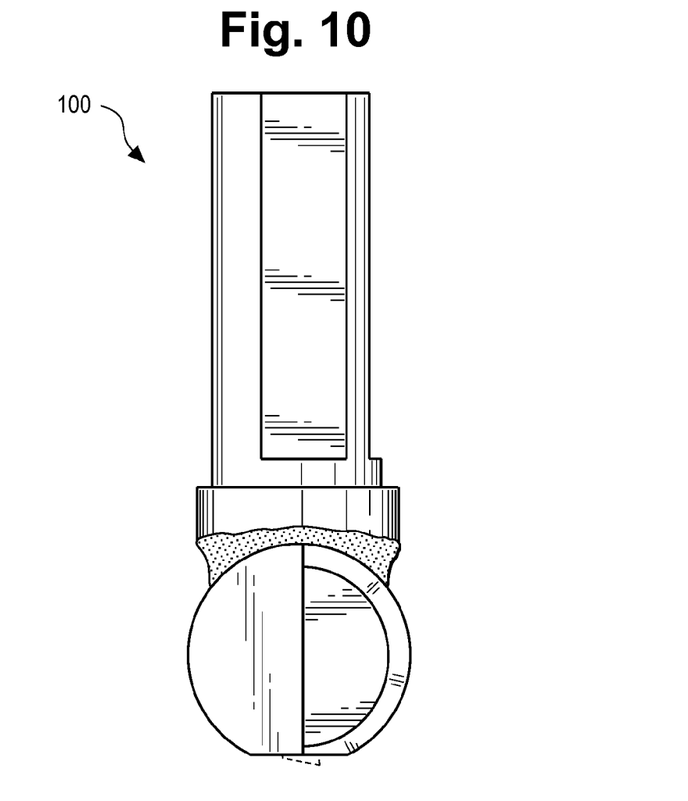
FIG. 10 depicts a left plan view of fly cutter cutting tool 100 with the carbide insert depicted in phantom.
Figure 11:
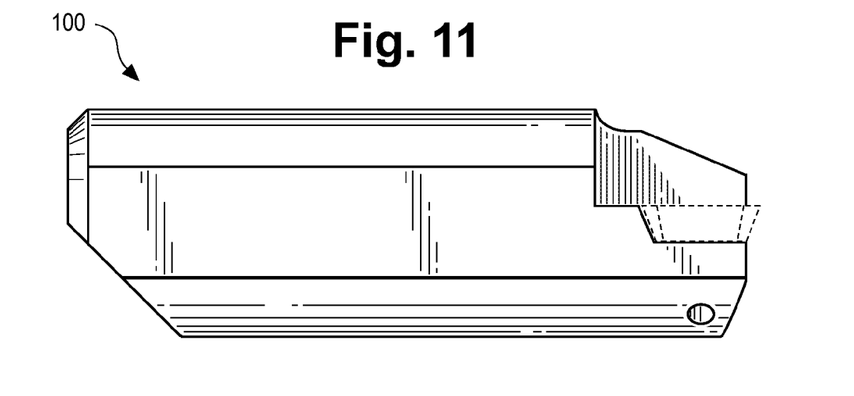
FIG. 11 depicts a bottom plan view of fly cutter cutting tool 100 with the carbide insert depicted in phantom.
Figure 12:
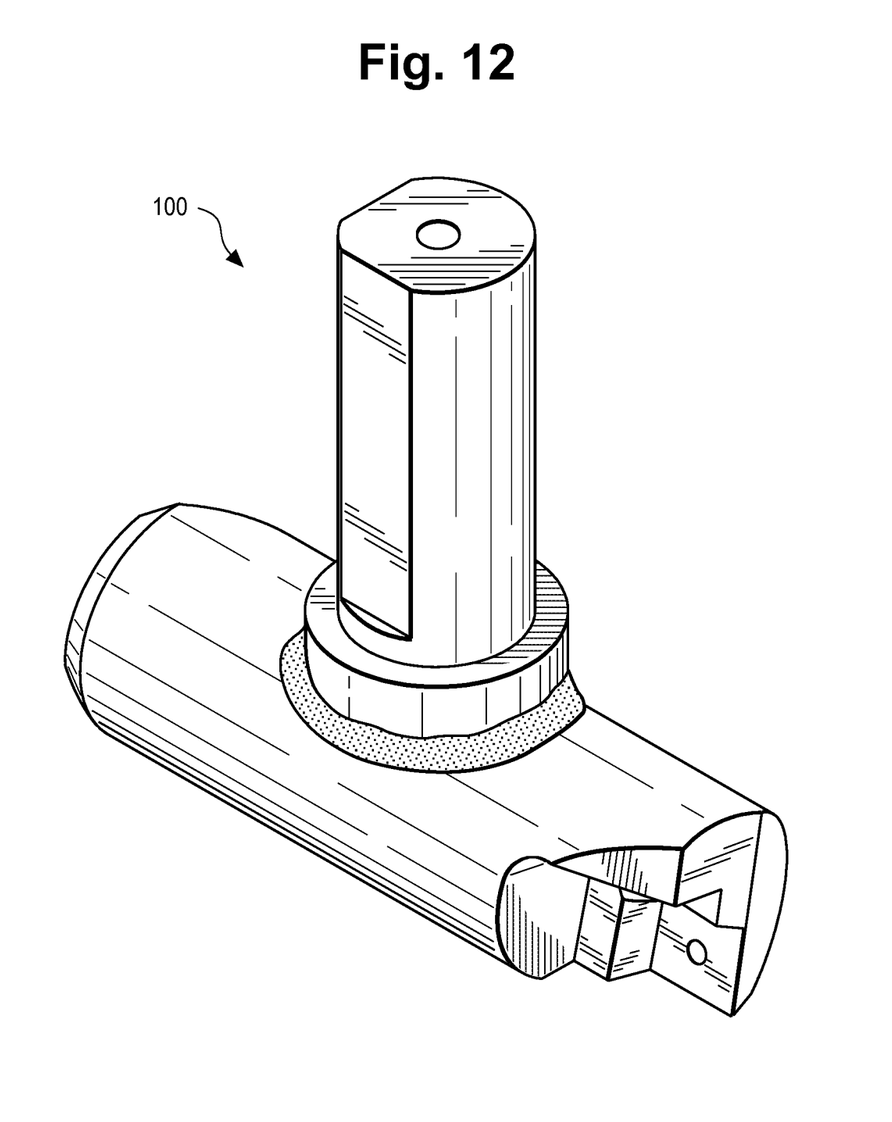
FIG. 12 depicts a front perspective view of fly cutter cutting tool 100.
Figure 13:
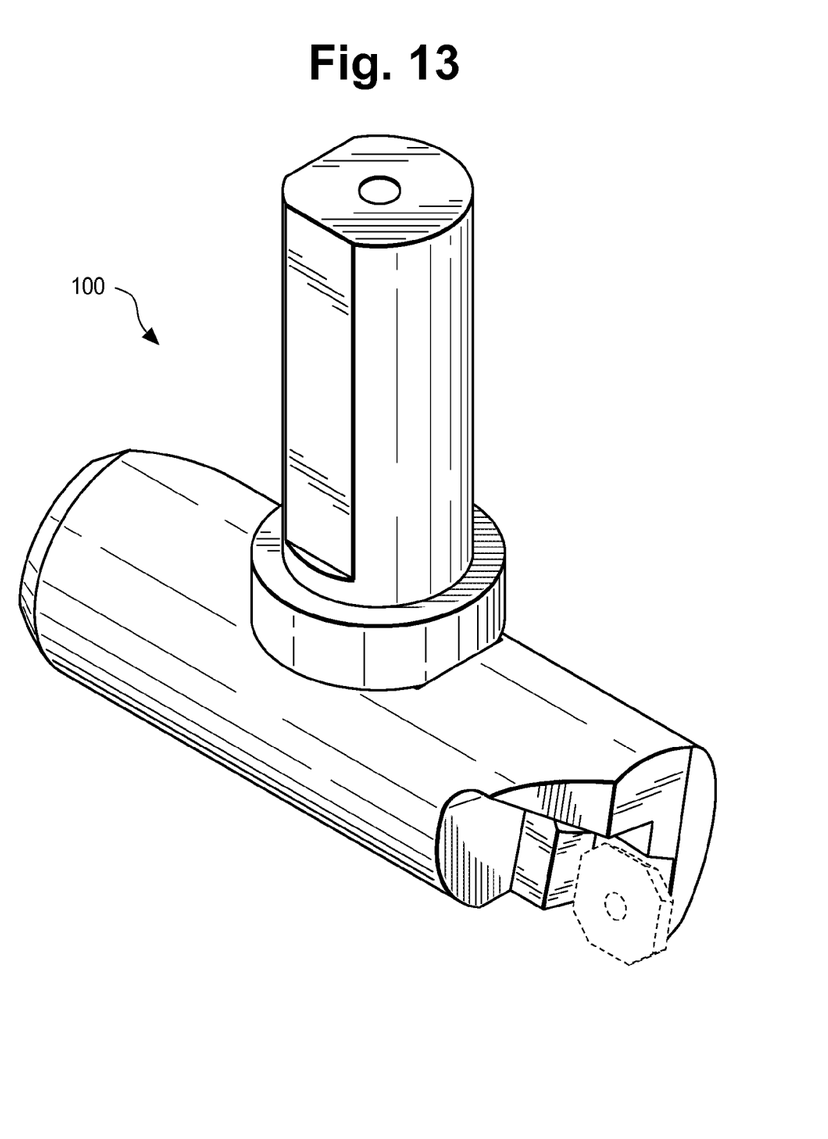
FIG. 13 depicts a top perspective view of fly cutter cutting tool 100 with the carbide insert depicted in phantom.
Figure 14:
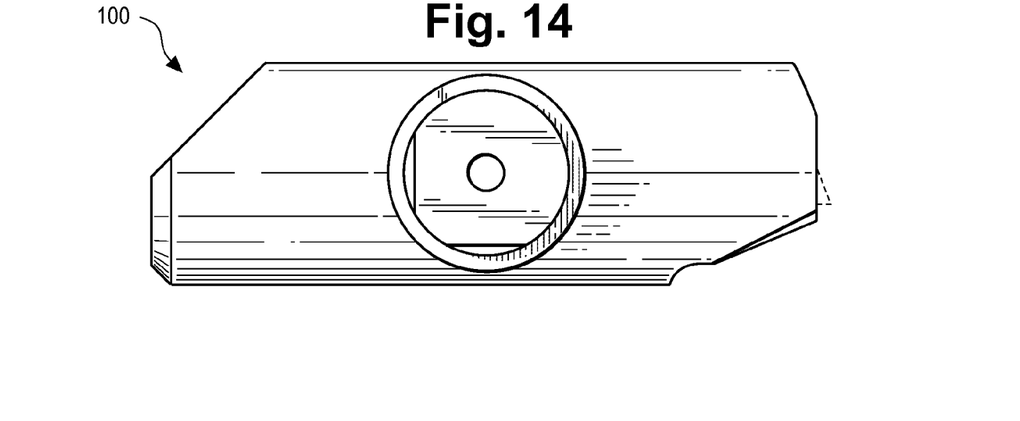
FIG. 14 depicts a top plan view of fly cutter cutting tool 100 with the carbide insert depicted in phantom.
Figure 15:
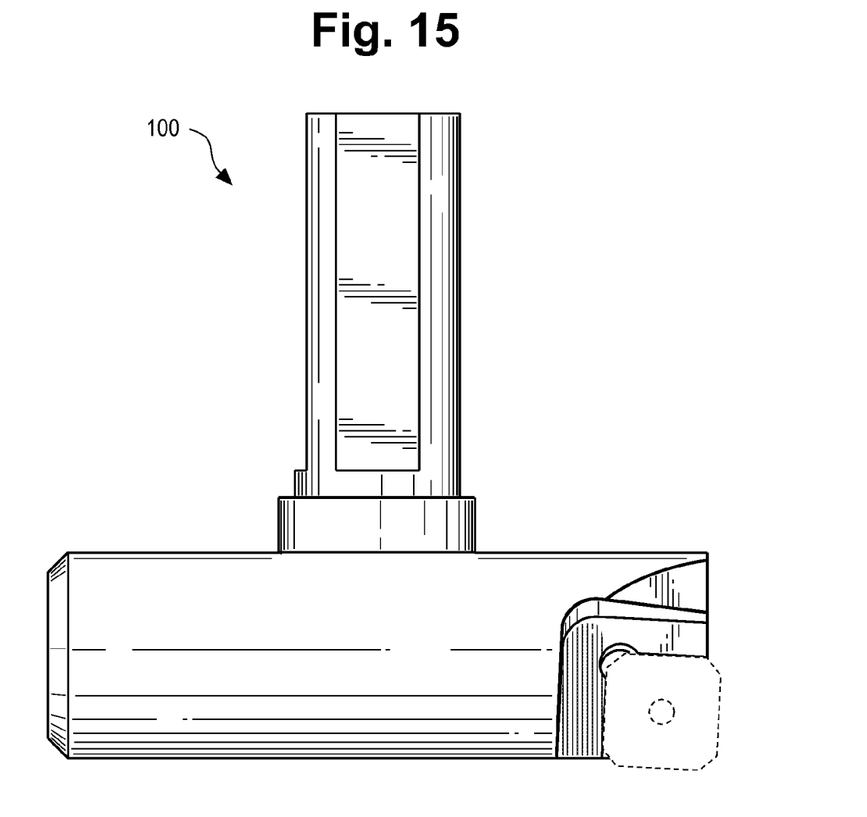
FIG. 15 depicts a front plan view of fly cutter cutting tool 100 with the carbide insert depicted in phantom.
Figure 16:
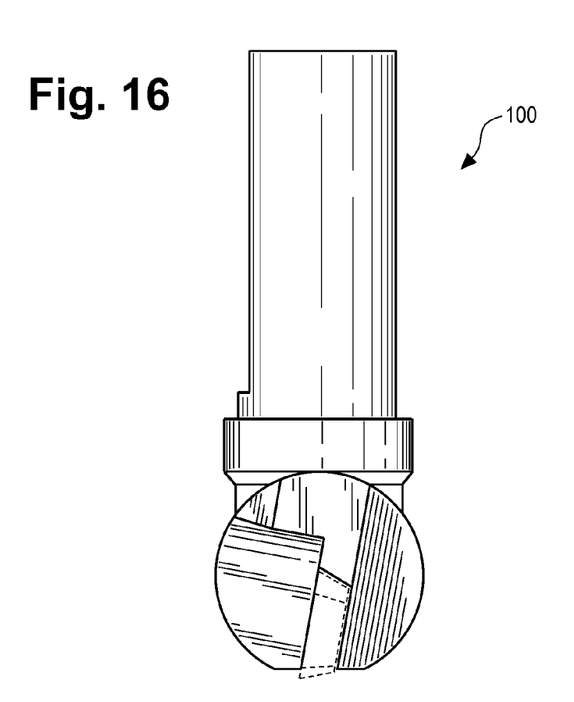
FIG. 16 depicts a right plan view of fly cutter cutting tool 100 with the carbide insert depicted in phantom.
Figure 17:
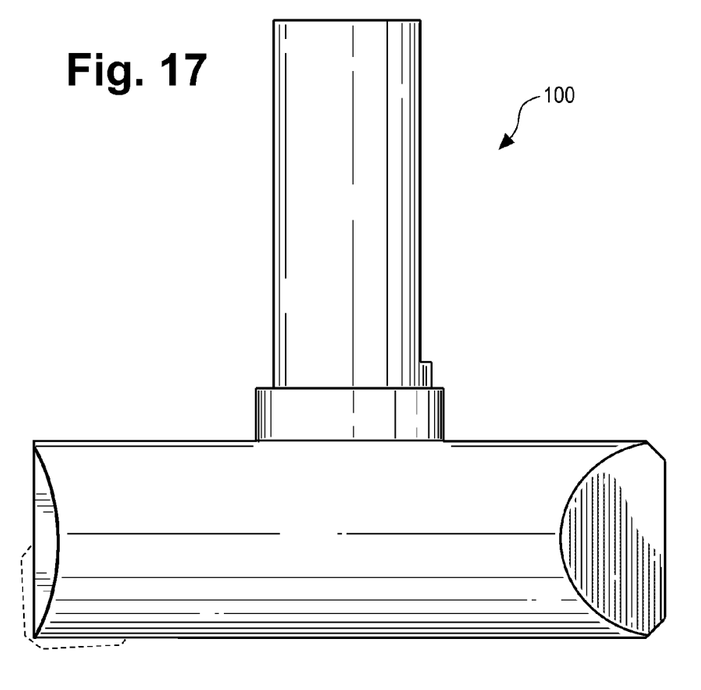
FIG. 17 depicts rear plan view of fly cutter cutting tool 100 with the carbide insert depicted in phantom.
Figure 18:
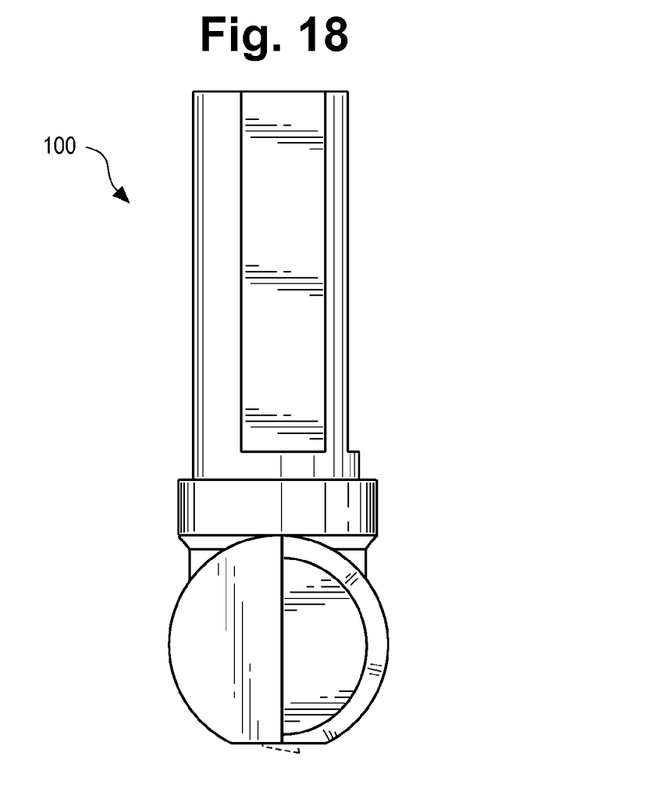
FIG. 18 depicts a left plan view of fly cutter cutting tool 100 with the carbide insert depicted in phantom.
Figure 19:
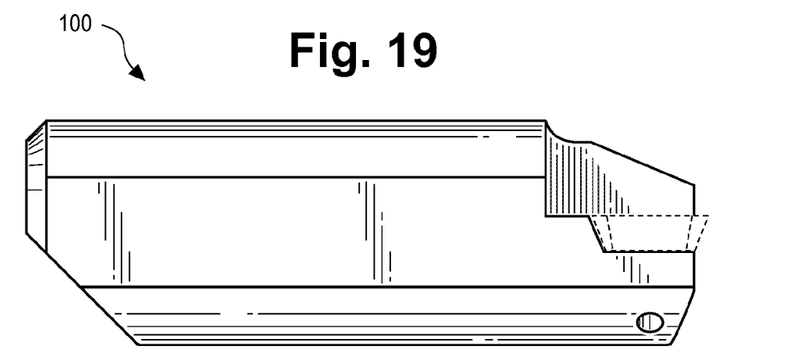
FIG. 19 depicts a bottom plan view of fly cutter cutting tool 100 with the carbide insert depicted in phantom.
Figure 20:
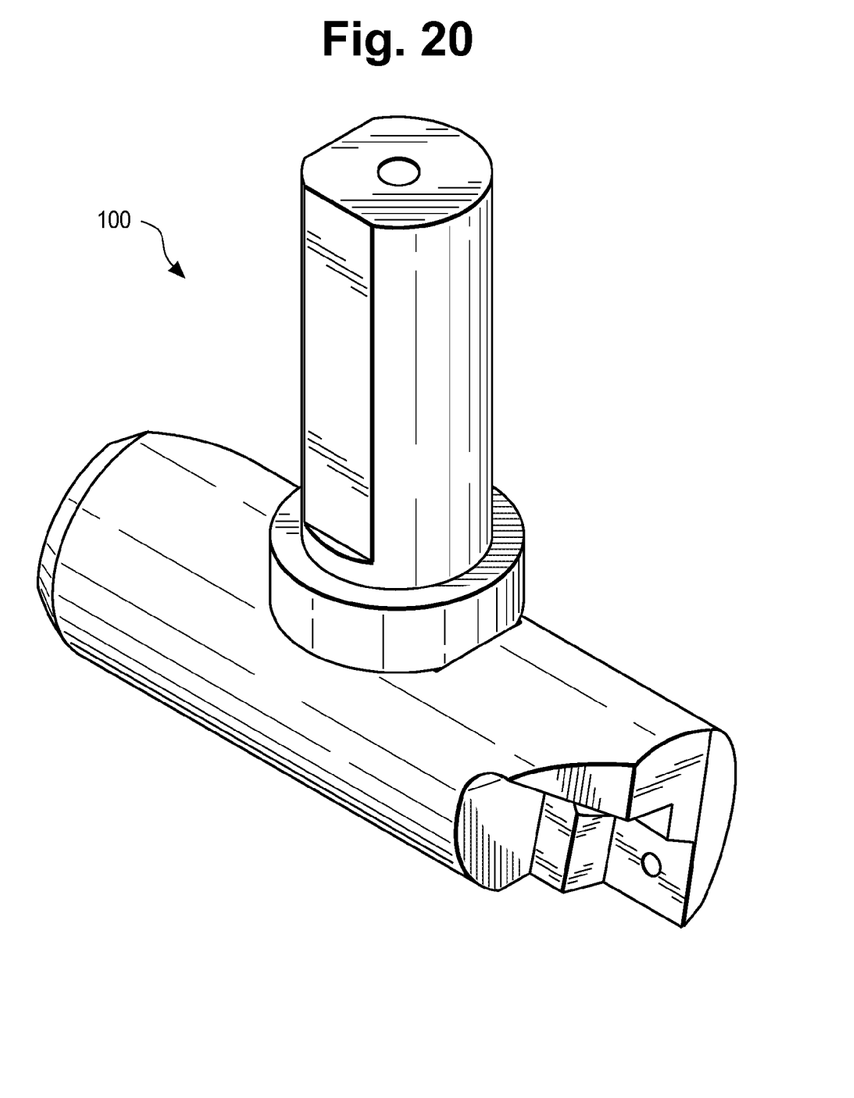
FIG. 20 depicts a top perspective view of fly cutter cutting tool 100.

Now adding FIG. 1, FIG. 2 and FIG. 3 to the consideration, the structure and function of fly cutter cutting tool 100 can be clearly seen. Fly cutter cutting tool 100 has great flexibility and can be used on a variety of machines including but not limited to, a horizontal moving bed milling machine (see FIG. 1) and a horizontal stationary bed milling machine (see FIG. 2 and FIG. 3).

Now adding FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19 and FIG. 20 to the consideration, the structure and function of fly cutter cutting tool 100 can be clearly seen. Fly cutter cutting tool 100 has mounting shaft 102 and cutting base 104 configured in a T-arrangement 114. Mounting shaft 102 is perpendicular or substantially perpendicular to cutting base 104. Referring specifically to FIGS. 4 through 12, mounting shaft 102 is welded with weld line 118 to cutting base 104. In FIGS. 13 through 20, mounting shaft 102 and cutting base 104 are a unitary piece.

Mounting shaft 102 has two or more locking surfaces 160 to facilitate receiving the mounting shaft 102 into the power head 106 of milling machine or other machine 108 and preventing rotation of the mounting shaft 102 within the power head 106 during the work or cutting process. The at least two locking surfaces 160 are opposed at 90 degree angles on the mounting shaft 102.

This 90 degree arrangement of the at least two locking surfaces 160 further allows for engagement of the power head 106 between the mounting shaft 102 and various cutting tools 100 that can be alternately inserted into power head 106 when operating from a carousel of cutting tools 100 in an automated milling machine process to allow for the change of cutting tools of multiple applications.

Cutting base 104 has a working end 120 and a counter-balance end 122. Working end 120 accepts the carbide insert. The mounting shaft 102 and the cutting base 104 are perpendicular or substantially perpendicular to each other. The T-arrangement 114 provides for an approximately equal mass on either side of mounting shaft 102 between the working end 120 and the counter-balance end 122 of cutting base 104. This facilitates balance of the tool 100 when rotated at high speeds.

Counter-balance end 122 features a relief angle bevel 132 which provides for a non-acute angle tool end to minimize impact and damage to the work piece 110 or fly cutter cutting tool 100 in the event of contact between the cutting tool 100 and work piece 110 or other objects in the event of normal use or operator error.

Referring specifically to FIG. 2 and FIG. 3, a shoulder 116 is created in work piece 110 as the work piece 110 is cut and material is removed. Fly cutter cutting tool 100 continues to rotate at rapid speeds against shoulder 116. Fly cutter cutting tool 100 needs clearance against shoulder 116 in order to continue to cut work piece 110. Relief angle bevel 132 allows the appropriate clearance so that cutting tool 100 may continue to cut work piece 110 without interference or damage from shoulder 116.

In the preferred embodiment, relief angle bevel 132 is between 40 and 50 degrees. In a more preferred embodiment, relief angle bevel 132 is between 43 and 47 degrees. In a most preferred embodiment, relief angle bevel 132 is between 44 and 46 degrees.

The counter-balance end 122 has rear bevel 112 on the backside. The rear bevel 112 provides an approximately equal mass reduction as compared to working end cutout 126 on working end 120. Rear bevel 112 counter-balances working end cutout 126 to prevent inference with the counter-balancing of T-arrangement 114.

Working end 120 has working end cutout 126. Working end cutout 126 has a hood top wall 146, a hood side wall 148 and a hood back wall 150. Hood top wall 146 and hood side wall 148 are beveled at an angle to facilitate the outward deflection of the machined chips (see FIG. 1 and FIG. 2) that are formed as the work piece 110 is cut. The outward deflection created by the hood top wall 146 and the hood side wall 148 reduce the accumulation of waste material on the longitudinal aspect of fly cutter cutting tool 100 and help prevent fouling between the cutting tool 100 and the work piece.

Hood back wall 150 facilitates attachment of the carbide insert to fly cutter cutting tool 100. Hood back wall 150 has threaded aperture 140. A threaded screw 140 cooperates with the carbide insert and the threaded aperture 140 to securely attached the carbide insert to hood back wall 150 of fly cutter cutting tool 100.

Hood back wall 150 also has a relief notch 144. Relief notch 144 provides spacing to facilitate insertion of the carbide cutting insert. The spacing provided by relief notch 144 allows fly cutter cutting tool 100 to accept a wide variety of four-sided carbide cutting inserts of different styles by different manufacturers.

Hood back wall 150 is beveled to create rake angle 124. Rake angle 124 provides for an angle between the carbide cutting insert and the work piece 110 which facilitates a cut that decreases the force necessary to complete the cut as well as reduction in harmonic chattering, or skip cutting, between the carbide insert and the work piece 110. Rake angle 124 also creates a space under the working end 120 of cutting tool 100. This space allows counter-balance end 122 to sweep and deflect the chips off of the surface of work piece 110 while rotating at high speeds.

In the preferred embodiment, rake angle 124 is between 3 and 5 degrees. In a more preferred embodiment, rake angle 124 is between 3 and 4 degrees. In a most preferred embodiment, rake angle 124 is between 3 and 3.5 degrees.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A fly cutter cutting tool comprising:
   a) the fly cutter cutting tool having a two piece assembly comprising a mounting shaft and a cutting base;
   b) the cutting base having both a working end and a counter-balance end;
   c) the working end accepting a carbide insert;
   d) the mounting shaft and the cutting base forming a T-arrangement;
   e) the mounting shaft being perpendicular or substantially perpendicular to the cutting base;
   f) the working end and the counter-balance end all being formed within a singular piece comprising the cutter base;
   g) the working end of the cutting base having a working end cutout; and
   h) the mounting shaft having at least two shaft locking surfaces,
   i) the counter-balance end of the cutting base having a rear bevel with an approximately equal mass reduction as that of the working end cutout.

2. The fly cutter cutting tool of claim 1 further comprising: and
   a) the rear bevel being on an oppositely disposed end of the cutting base than the working end.

3. The fly cutter cutting tool of claim 2 further comprising:
   a) the working end cutout having a rake angle; and
   b) the rake angle being between 3 and 5 degrees.

4. The fly cutter cutting tool of claim 3 further comprising:
   a) the working end cutout having a hood top wall, a hood side wall and a hood back wall;
   b) the counter-balance end having a relief angle bevel;
   c) the relief angle bevel being between 40 and 50 degrees;
   d) the at least two locking surfaces being opposed to each other at an angle of 90 degrees on the mounting shaft; and
   e) the relief angle bevel being on an oppositely disposed end of the cutting base than the working end.

5. The fly cutter cutting tool of claim 4 further comprising:
   a) the hood back wall having a hood relief notch; and
   b) the hood back wall having a threaded aperture.

6. A fly cutter tool comprising:
   a) the fly cutter cutting tool being a unitary piece comprising a mounting shaft and a cutting base;
   b) the cutting base having both a working end and a counter-balance end;
   c) the working end accepting a carbide insert;
   d) the mounting shaft and the cutting base forming a T-arrangement;
   e) the mounting shaft being perpendicular or substantially perpendicular to the cutting base;
   f) the working end and the counter-balance end all being formed within a singular piece comprising the fly cutter cutting tool;
   g) the working end of the cutting base having a working end cutout; and
   h) the mounting shaft having at least two shaft locking surfaces,
   i) the counter-balance end of the cutting base having a rear bevel with an approximately equal mass reduction as that of the working end cutout.

7. The fly cutter cutting tool of claim 6 further comprising: and
   a) the rear bevel being on an oppositely disposed end of the cutting base than the working end.

8. The fly cutter cutting tool of claim 7 further comprising:
   a) the working end cutout having a rake angle; and
   b) the rake angle being between 3 and 5 degrees.

9. The fly cutter cutting tool of claim 8 further comprising:
   a) the working end cutout having a hood top wall, a hood side wall and a hood back wall;
   b) the counter-balance end having a relief angle bevel;
   c) the relief angle bevel being between 40 and 50 degrees;
   d) the at least two locking surfaces being opposed to each other at an angle of 90 degrees on the mounting shaft; and
   e) the relief angle bevel being on an oppositely disposed end of the cutting base than the working end.

10. The fly cutter cutting tool of claim 9 further comprising:
    a) the hood back wall having a hood relief notch; and
    b) the hood back wall having a threaded aperture.

* * * * *